1,527,175

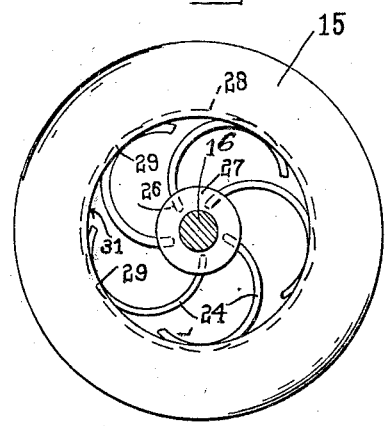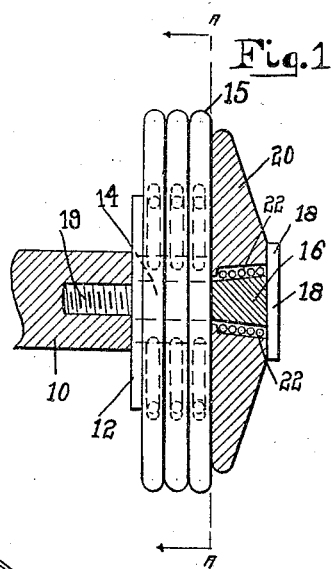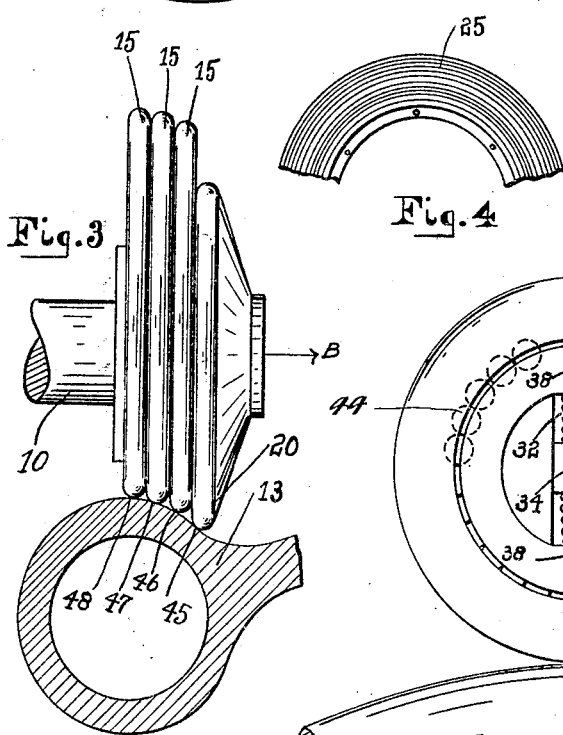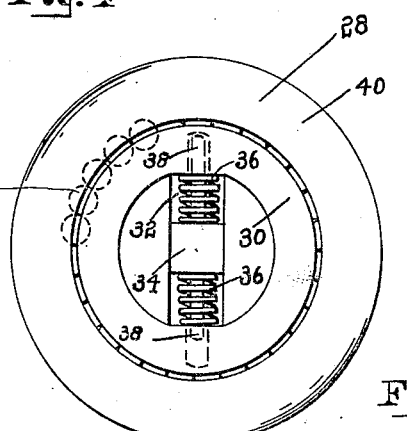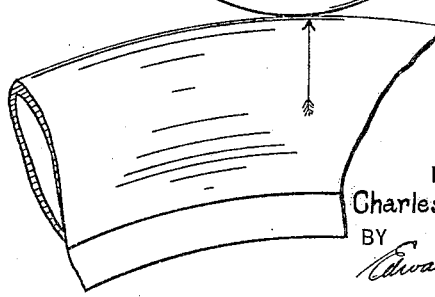
INVENTOR
Charles H. Desautels
BY
ATTORNEY Patented Feb. 24, 1925.

UNITED STATES PATENT OFFICE.

CHARLES H. DESAUTELS, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

TIRE-STITCHING DEVICE.

Application filed April 30, 1921. Serial No. 465,672.

*To all whom it may concern:*

Be it known that I, CHARLES H. DE-SAUTELS, a citizen of the United States of America, residing at Springfield, in the county of Hampden and State of Massachusetts, have invented certain new and useful Improvements in a Tire-Stitching Device, of which the following is a specification.

My invention relates to fabric shaping or stitching mechanism for tire making machines, and has for its object the provision of a stitcher which, for a given ratio of core rotation to the radial movement of a stitcher along the outside of a tire forming core, will smooth and roll down tire fabric to the configuration of a tire forming core in a better and quicker manner than the stitchers now used.

It is customary to employ a rotatably mounted disk in smoothing down a ply of fabric to the configuration of a tire forming core. After a ply of fabric has been mounted upon a tire forming core as a flat band, the core is rotated and the disk, mounted upon a guiding arm, is moved radially toward the center of the core, pressing down the fabric as well as shaping it to the configuration of the core.

In making a tire there is a tendency for the operator of a tire making machine to hurry the laying of a fabric ply to the configuration of a tire forming core by running the stitcher too rapidly across the core. If such is the case the fabric is pressed down upon the core only along a line of widely spaced spiral convolutions starting at the tread and running down to the bead. The spaces between the spiral convolutions remain unpressed so that adjacent layers are not pressed in the desired intimate association with one another.

It is the purpose of my invention to provide a stitcher which can be as conveniently operated as the single disk type of stitcher and one which will roll down the fabric in more intimate relationship with the tire forming core or with previously laid fabric than it is possible to attain with the single disk stitcher except when the single disk stitcher has a very slow radial movement in comparison to the speed of revolution of the tire forming core.

My invention will now be explained in connection with the accompanying drawings, in which;

Fig. 1 is a side view of the preferred form of stitcher, partly in section;

Fig. 2 is a section on line A—A of Fig. 1;

Fig. 3 shows my stitcher being used in conjunction with a tire core;

Fig. 4 is a segmental side view of a tire mounted upon a tire forming core; and

Fig. 5 shows a modified form of disk which may be used in place of the disk shown in Figs. 1 and 2.

The improved stitcher is carried as by an arm 10 having a flange or collar 12. A stud 16 having a flange 18 is screwed, as indicated at 19, into the end of the arm 10. The stud 16 has a disk 20 mounted upon it on the ball bearings 22. A plurality of disks 15 are mounted upon the section 14 of the stud 16 so that they may yield transversely as will be described. The transversely yieldable disks 15 when in normal position are held in concentric relation with the arm 10 by a plurality of spring members 24 fixed as shown by 26, in the bushing 27, which rotates about the stud 16. A portion 29 of each spring member 24 lies in a groove 28 on the inside face 31 of the disk 15. While in this type of construction the disk 20 is preferably non-yieldably mounted on stud 16, it may, if desired, be made yieldable in a similar manner to disks 15.

My stitcher shown in Fig. 3 acting in conjunction with a tire forming core 13, travels in the general direction as indicated by the arrow B. The non-yieldable disk 20 is directed by the arm 10 so as to be in contact with the core (shown at point 45) as the core rotates. The disks 15, which are transversely yieldable with respect to the arm 10, take the position as shown and form a plurality of additional contact points 46, 47 and 48 with the core. When a ply of fabric is rolled down upon a tire core by my improved stitcher it will be pressed down in a plurality of spiral convolutions so that any wide non-compressed space between adjacent convolutions made by one roller will be pressed down by the other rollers.

A modified yieldable type of disk 40 may be used in place of the disk 15 previously described. A non-rotatable ring 30 having a transverse slot 32, is mounted upon an arm 34 corresponding to the arm 10 and fitting in the slot 32. Spring 36, held in position by lugs 38 on the arm 34, tend to keep the ring 30 central to arm 34 but allow the ring to move transversely in a straight line towards or away from the core when pressure is exerted against the ring in the direction shown by the arrow in Fig. 5. An outside ring 40, which is adapted to contact with a tire core, is rotatably mounted upon the ring 30 thru a roller or ball bearing 44.

There are many modifications which will perform my purpose without departing from the scope and spirit of my invention and I do not intend to limit myself to any specific means of carrying out my invention except as restricted by the following claims.

Having thus described my invention, I claim:

1. A tire stitcher embodying a support, a plurality of independently rotatable disks mounted upon the support and means whereby the rotatable disks can be rotated at varying eccentricities about the support.

2. A tire stitcher embodying a support and a plurality of independently rotatable disks yieldably mounted thereon; said disks being adapted to vary eccentrically on the support and to form a plurality of contact points with a partially formed tire carcass.

3. A stitching disk comprising a supporting arm, a sleeve adapted to rotate about said arm, a ring, and a plurality of springs fixed to the sleeve and engaging in a groove located in the inside periphery of the ring.

CHARLES H. DESAUTELS.